April 30, 1968     S. E. ALLEN ET AL     3,380,653
TIMING AND RECORDING APPARATUS FOR LIQUID DISPENSING SYSTEM
Filed Jan. 17, 1966     3 Sheets-Sheet 1
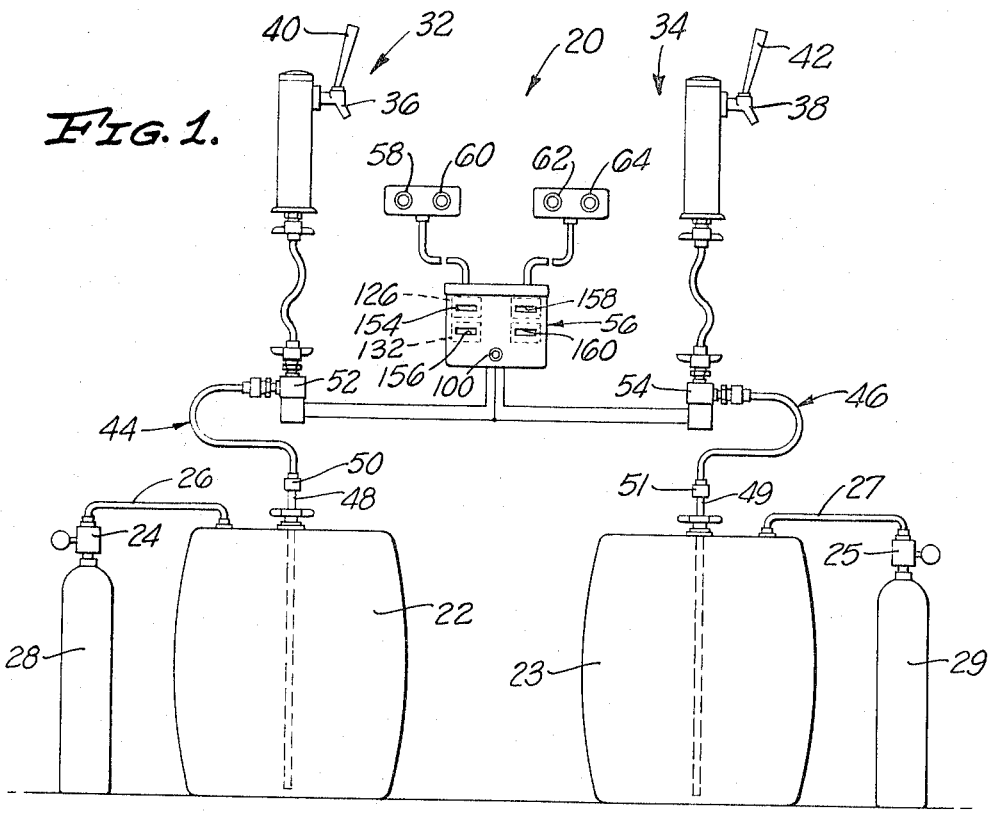
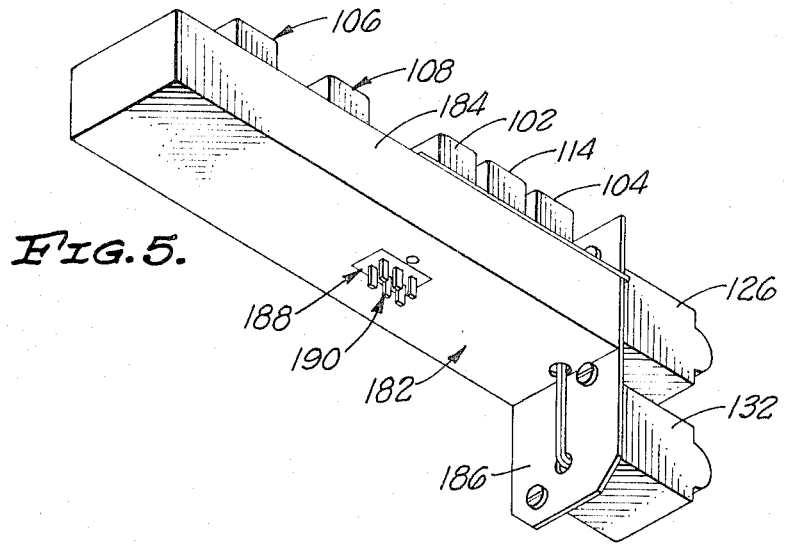
INVENTORS
SCOTT E. ALLEN,
WILLIAM H. NICOLA
BY THEIR ATTORNEYS
HARRIS, KIECH, RUSSELL & KERN

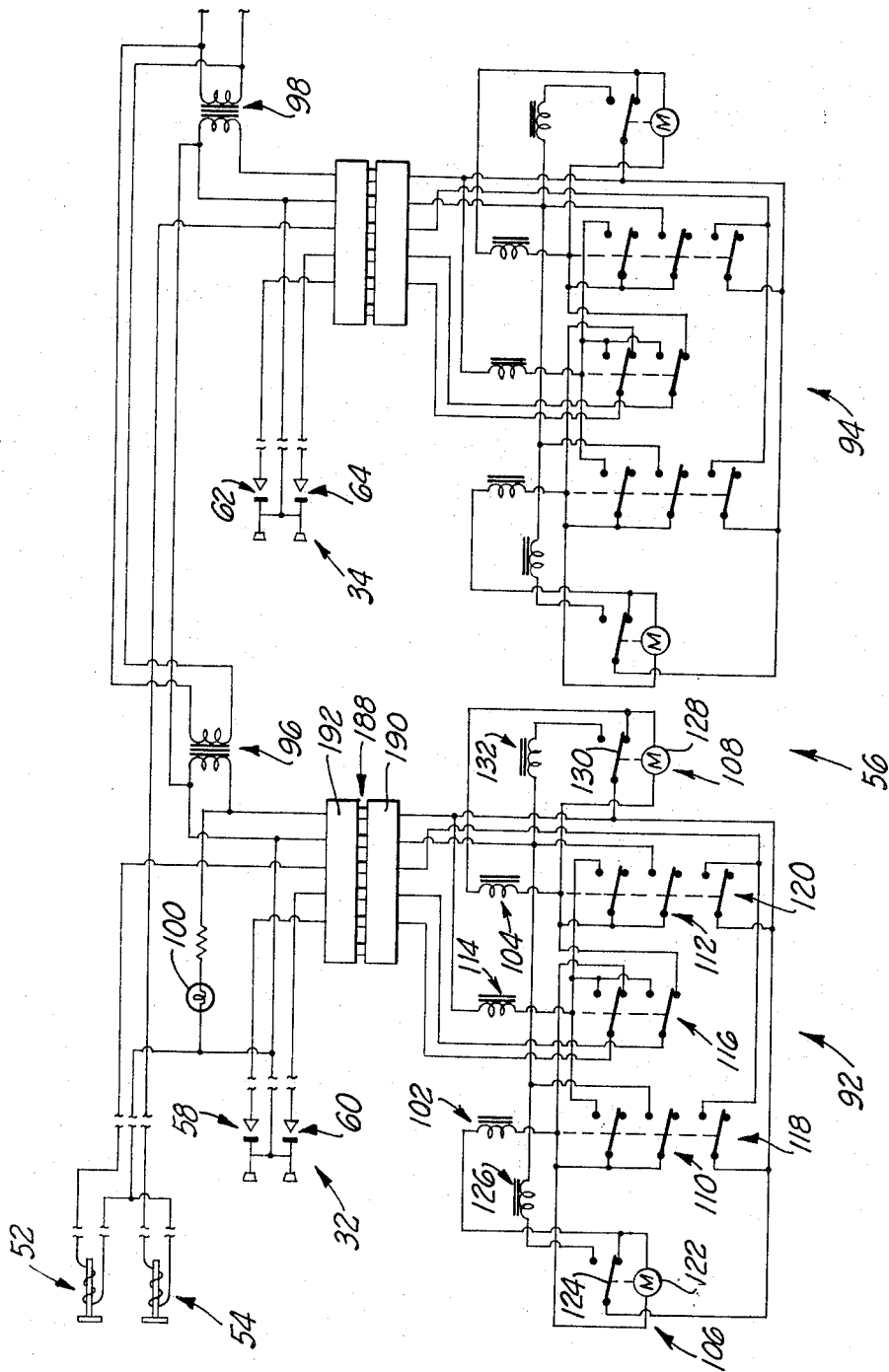

April 30, 1968  S. E. ALLEN ETAL  3,380,653
TIMING AND RECORDING APPARATUS FOR LIQUID DISPENSING SYSTEM
Filed Jan. 17, 1966  3 Sheets-Sheet 3
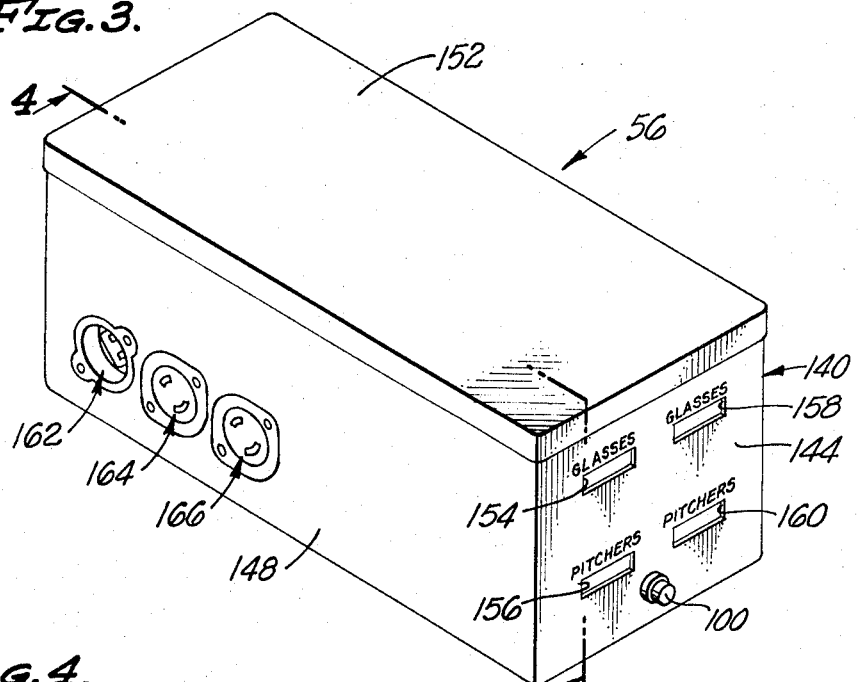
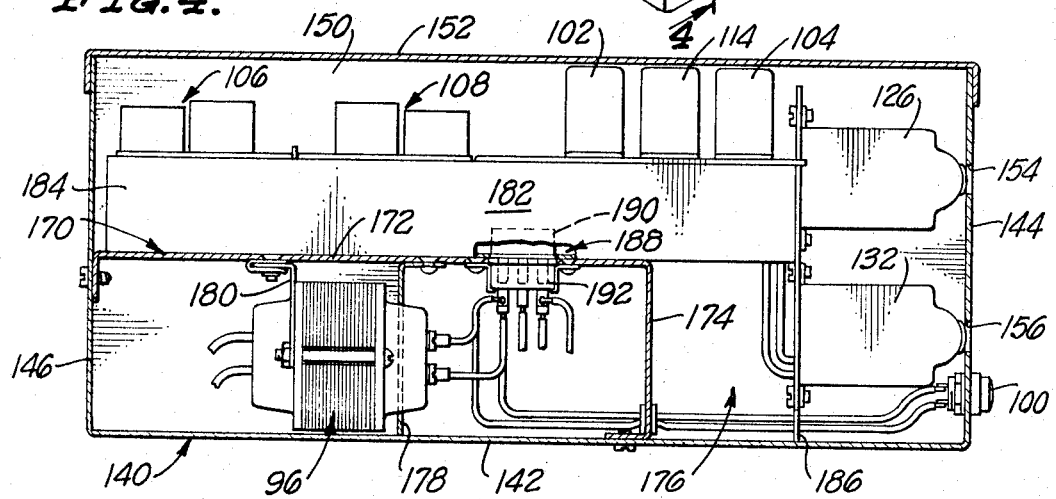
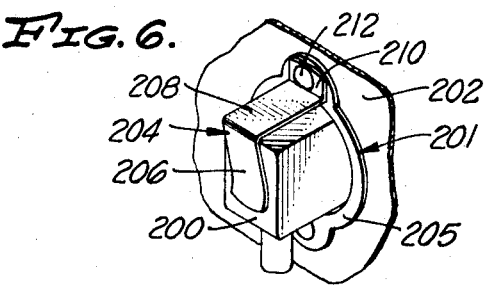
INVENTORS
SCOTT E. ALLEN,
WILLIAM H. NICOLA
BY THEIR ATTORNEYS
HARRIS, KIECH, RUSSELL & KERN

United States Patent Office 3,380,653
Patented Apr. 30, 1968

3,380,653
TIMING AND RECORDING APPARATUS FOR LIQUID DISPENSING SYSTEM
Scott E. Allen, Los Angeles, and William H. Nicola, Garden Grove, Calif., assignors to Swingspout Measure Co., Los Angeles, Calif., a corporation of California
Filed Jan. 17, 1966, Ser. No. 521,109
7 Claims. (Cl. 235—1)

ABSTRACT OF THE DISCLOSURE

A timing and recording apparatus for a beer dispensing system, comprising a housing containing removable timing and recording units corresponding in number to the number of bartending stations in the system. Each timing and recording unit is seatable on and adapted to be plugged into a base in the housing, which base supports a transformer for supplying power to the timing and recording unit. Glass and pitcher counters forming part of each timing and recording unit are visible through counter windows in the front wall of the housing.

BACKGROUND OF INVENTION AND CROSS REFERENCE TO RELATED APPLICATION

The present invention relates in general to the construction of a timing and recording apparatus and is particularly applicable to a dispensing system for metering predetermined quantities of liquids, such as beer. Consequently, the invention will be considered herein in such an environment for convenience.

This application discloses subject matter which is disclosed and claimed in our co-pending application Ser. No. 521,202, filed Jan. 17, 1966. More particularly, our co-pending application discloses and claims a dispensing system which, upon selective manual actuation, automatically dispenses either of two different metered quantities of beer, such as a glass or a pitcher, and automatically records whether a glass or pitcher was dispensed. The dispensing system is capable of selective manual actuation from any one of two or more bartending stations to dispense a glass or pitcher of beer automatically at either station, and to record the quantity dispensed.

As further background, our co-pending application discloses and claims a beer dispensing system which includes normally closed solenoid valves for controlling the flow of beer through flow lines leading to serving taps at the respective bartending stations. Each solenoid valve is controlled by a timing and recording circuit means which energizes the solenoid valve for a predetermined interval of time so as to discharge a metered quantity of beer, such as a glass or pitcher, from the corresponding serving tap, and which records the dispensing of either a glass or pitcher of beer, as the case may be. More specifically, each such circuit means includes two timers or timing means respectively capable of energizing the corresponding solenoid valve for intervals of time respectively sufficient to dispense a glass and a pitcher of beer, and each further includes two counters or counting means respectively capable of recording the numbers of glasses and pitchers of beer dispensed from the serving tap under the control of the respective timers. Each such timing and recording circuit means is selectively actuated by glass-dispensing and pitcher-dispensing switches conveniently located at the corresponding bartending station, preferably adjacent the corresponding serving tap.

Summary and objects of invention

With the foregoing as background, a primary object of the present invention is to provide a timing and recording apparatus which incorporates the timing and recording circuit means associated with one or more bartending stations, which may be remotely located relative to the bartending station or stations, and which is preferably sealed so that it cannot be tampered with.

Another object of the invention is to provide such a timing and recording apparatus wherein each timing and recording circuit means operates at a reduced voltage, e.g., 24 volts, as compared to the normal 110-volt supply. Preferably, the timing and recording apparatus provides a separate transformer for each timing and recording circuit means.

Another and important object of the invention is to provide a timing and recording apparatus of the foregoing nature comprising a housing containing a base which includes a number of transformers corresponding to the number of bartending stations, and further containing timing and recording units, equal in number to the number of bartending stations, seated on the base and having plug-and-socket connections with the respective transformers, each such timing and recording unit incorporating one of the timing and recording circuit means hereinbefore outlined.

With the foregoing construction, the base may be provided with the required number of transformers, and the required number of timing and recording units may simply be seated on the base with plug-and-socket connections to the corresponding transformers. Consequently, by varying the number of transformers incorporated in the base, by correspondingly varying the number of timing and recording units seated on the base and connected to the respective transformers, and by further correspondingly varying the size of the housing, any number of bartending stations may be accommodated very simply, which is an important feature of the invention.

More specifically, an important object of the invention is to provide a timing and recording apparatus of the foregoing nature which includes: a housing having bottom, front, rear and side walls; the front wall of the housing having at least one counter window therein; a base mounted in the housing and having a top wall and including at least one transformer; at least one timing and recording unit seated on the top wall of the base and including electrical components at least one of which is a counter visible through the counter window; and plug-and-socket means on the base and the unit for electrically connecting such electrical components to the transformer.

Still more specifically, another important object of the invention is to provide a timing and recording apparatus comprising: a housing having bottom, front, rear and side walls; the front wall of the housing having at least one pair of counter windows therein; a base mounted in the housing and having a top wall spaced upwardly from the bottom wall of the housing and including at least one transformer beneath the top wall of the base; at least one timing and recording unit seated on the top wall of the base and including electrical components two of which are counters respectively visible through the counter windows; and plug-and-socket means on the base and the unit for electrically connecting such electrical components to the transformer.

A further object of the invention is to provide a timing and recording apparatus of the foregoing character wherein each transformer is spaced upwardly from the bottom wall of the housing and is secured to the top wall of the base, thereby effectively isolating it from the housing.

Yet another object is to provide a base which includes a front wall spaced rearwardly from the front wall of the housing and further isolating the transformer or transformers from the housing and from the timing and recording unit or units seated on the base within the housing.

Still another object of the invention is to provide a timing and recording apparatus wherein the counters of each unit, and the corresponding counter windows, are vertically spaced, wherein the lowermost counter of each unit, and the corresponding counter window, are below the top wall of the base, and wherein the lowermost counter of each unit is located forwardly of the front wall of the base and between the front wall of the base and the front wall of the housing. This construction provides a compact arrangement utilizing a minimum of space, which is an important feature.

An additional object of the invention is to provide a timing and recording unit wherein the timers, and other electrical components, are located in a portion of the unit which is disposed rearwardly of the counters and which is seated on the base.

Still another object is to provide plug-and-socket connections, between the transformers and the timing and recording units, each of which includes a socket carried by the base and includes a mating plug carried by the unit.

An additional important object of the invention is to provide an improved means for preventing inadvertent disconnection of an electrical plug from a mating socket.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawings.

Description of drawings

In the drawings:

FIG. 1 is a diagrammatic view of a beer dispensing system incorporating a timing and recording apparatus of the invention which includes two timing and recording units respectively controlling serving taps at two different bartending stations, it being understood that the invention may be applied to any desired number of bartending stations;

FIG. 2 is a wiring diagram showing the electrical circuitry of the beer dispensing system and showing the timing and recording circuit means incorporated in the timing and recording units of the invention;

FIG. 3 is a top isometric view of the exterior of the timing and recording apparatus of the invention;

FIG. 4 is a longitudinal sectional view in a vertical plane taken as indicated by the arrowed line 4—4 of FIG. 3;

FIG. 5 is a bottom isometric view of one of the timing and recording units of the invention; and FIG. 6 is an isometric view of means for preventing accidental or inadvertent disengagement of an electrical plug from a socket.

DESCRIPTION OF PREFERRED EMBODIMENT OF INVENTION

Dispensing system generally

Referring initially to FIG. 1 of the drawings, a beer dispensing system which embodies the invention is designated generally by the numeral 20 and is shown as connected to a source or sources of beer under pressure, such as kegs 22 and 23. The pressures in the kegs 22 and 23 are maintained substantially constant, as beer is drawn therefrom, by pressure regulators 24 and 25 having their outlets connected to the kegs by pressure lines 26 and 27, the inlets of the pressure regulators being connected to cylinders 28 and 29 of carbon dioxide, or other suitable gas.

The particular dispensing system 20 which is illustrated in the drawings is capable of delivering either glasses or pitchers of beer from the kegs 22 and 23 to either of two bartending stations 32 and 34, and of counting and recording the numbers of glasses and pitchers delivered to the respective stations. However, the invention is not limited to any specific number of bartending stations.

Further, it will be understood that the invention is not limited to dispensing and counting glasses and pitchers of beer since it may be utilized for other purposes. Thus, it will be understood that the particular dispensing system 20 shown in the drawings is intended as illustrative of the invention only.

Considering the system 20 in more detail, it includes two conventional beer serving taps 36 and 38 at the respective bartending stations 32 and 34, the respective serving taps 36 and 38 being equipped with the usual manually operable valves 40 and 42. When the dispensing system 20 of the invention is in operation to serve either or both bartending stations 32 and 34, the corresponding valve or valves 40 and 42 are left open.

The serving taps 36 and 38 are connected to the kegs 22 and 23 by flow lines 44 and 46 having their outlet ends connected to the respective taps. The two flow lines 44 and 46 are shown as having inlet ends formed by the lower ends of inlet pipes 48 and 49 connected to and extending downwardly into the kegs 22 and 23 in the usual manner. The inlet pipes 48 and 49 are provided at their upper ends with fittings 50 and 51 connected to the respective flow lines 44 and 46.

Installed in the respective flow lines 44 and 46 between the kegs 22 and 23 and the respective serving taps 36 and 38 are normally closed solenoid valves 52 and 54 which are energized for predetermined intervals of time to dispense predetermined measured quantities, such as glasses or pitchers, the quantities dispensed being directly proportional to the times that the solenoid valves are energized because of the substantially constant pressures maintained in the kegs 22 and 23. The solenoid valves 52 and 54 are regulated by a timing and recording apparatus 56 of the invention which will be described in more detail hereinafter. Suffice it to say for the present that the apparatus 56 determines the intervals of time that the solenoid valves 52 and 54 are energized, and thus determines the quantities of beer dispensed thereby, this apparatus also recording the numbers of glasses and pitchers dispensed. The apparatus 56 is actuated by manually-operated, glass-dispensing and pitcher-dispensing switches 58 and 60 at the bartending station 32, and by manually-operated, glass-dispensing and pitcher-dispensing switches 62 and 64 at the bartending station 34. Preferably, the apparatus 56 is located remotely from the bartending stations 32 and 34, and is sealed so that it cannot be tampered with.

It is important that the flow lines 44 and 46 have substantially constant internal cross sectional areas, between the respective solenoid valves 52 and 54 and the respective serving taps 36 and 38, to prevent and expansion of the beer downstream from the solenoid valves which would tend to produce excessive foaming thereof. With this construction, glasses or pitchers of beer are dispensed from the serving taps 36 and 38 with only the normal heads of foam.

It will be noted that after a metered quantity of beer has been dispensed from one of the taps, e.g., the tap 36, and the corresponding solenoid valve 52 has closed, the flow line 44 downstream from the solenoid valve will remain filled with beer. This residual beer is discharged from the tap 36 the next time the solenoid valve 52 is energized. Preferably, the flow line 44 downstream from the solenoid valve 52 is relatively short, and its internal cross sectional area is relatively small. With this construction, the residual beer remaining in the flow line downstream from the solenoid valve 52 has a relatively small volume, e.g., no more than a few percent of the volume of a conventional beer glass. Consequently, the residual of a conventional beer glass. Consequently, the residual beer trapped in the flow line 44 downstream from the solenoid valve 52 has no deleterious effect on the next serving of beer from the tap 36.

Timing and recording circuit means

Turning to FIG. 2 of the drawings, in the particular embodiment under consideration, the timing and recording apparatus 56 of the invention includes two timing and recording circuit means 92 and 94 respectively powered by parallel-connected transformers 96 and 98. An indicator light 100 indicates that the apparatus 56 is in operation.

The two circuit means 92 and 94 respectively correspond to the two bartending stations 32 and 34, and respectively control the two solenoid valves 52 and 54. The manually-operated, glass-dispensing and pitcher-dispensing switches 58 and 60 at the bartending station 32 operate the circuit means 92. Similarly, the glass-dispensing and pitcher-dispensing switches 62 and 64 at the bartending station 34 operate the circuit means 94. The two circuit means 92 and 94 are identical so that only the circuit means 92 will be considered in detail.

The glass-dispensing and pitcher-dispensing switches 58 and 60 are preferably push button switches which are closed only momentarily. When closed, the switches 58 and 60 respectively energize glass-dispensing and pitcher-dispensing timers 106 and 108. The relays 102 and 104 are respectively provided with holding contact means 110 and 112 which establish holding circuits through the respective relays 102 and 104, through the respective timers 106 and 108, and through another relay 114, the latter having contact means 116 which de-activates the switches 58 and 60. Consequently, once one of the switches 58 or 60 has been closed momentarily to energize the corresponding relay 102 or 104, the corresponding timer 106 or 108, and the relay 114, any subsequent actuations of the switches 58 and 60 are ineffective. It is therefore impossible, by repeated actuations of the switch 58 or 60, to dispense more than the metered quantity of beer corresponding to the switch initially actuated.

The relays 102 and 104 respectively include contact means 118 and 120 for energizing the solenoid valve 52, the length of time that this solenoid valve remains energized depending upon whether the glass-dispensing timer 106 or the pitcher-dispensing timer 108 was initially energized by the glass-dispensing switch 58 or the pitcher-dispensing switch 60.

At the end of the interval of time required to dispense a glass of beer, the motor 122 of the timer 106 moves a two-position switch 124 thereof into a position to energize a glass counter 126 which records the fact that a glass of beer has been dispensed. At the same time, the switch 124 de-energizes the relay 102, the timer 106 and the relay 114, the timer being a type which is returned to its starting position automatically upon de-energization thereof, as disclosed in more detail in our aforementioned co-pending application.

Similarly, at the end of the interval of time required to dispense a pitcher of beer, the motor 128 of the timer 108 moves a two-position switch 130 thereof into a position to energize a pitcher counter 132 for recording the fact that a pitcher of beer has been dispensed. At the same time, the timer switch 130 de-energizes the relay 104, the timer 108 and the relay 114, the timer 108 also returning automatically to its starting position.

Thus, it will be apparent that in order to dispense a glass of beer from the serving tap 36 at the bartending station 32, it is merely necessary to close the push button switch 58 momentarily. This energizes the relay 102, through the contact means 116 of the relay 114, whereupon the relay 102 establishes its own holding circuit, through the holding contact means 110; energizes the relay 114 to de-activate the push button switches 58 and 60; and energizes the solenoid 52 through the contact means 118. Also, the timer 106 is energized. At the end of the interval of time required to dispense a glass of beer, the timer switch 124 actuates the counter 126 to record the glass of beer, and simultaneously de-energizes the relay 102, the timer 106, and relay 114 and the solenoid valve 52 to ready the circuit means 92 for operation to dispense and record another glass of beer upon momentary closure of the switch 58, or a pitcher of beer upon momentary closure of the switch 60. The circuit means 92 operates in essentially the same manner upon momentary closure of the pitcher-dispensing switch 60, so that a further description is not necessary.

The circuit mean 94 operates in the same manner as the circuit means 92 to dispense either glasses or pitchers of beer at the bartending station 34. Consequently, it is unnecessary to describe the circuit means 94 in detail.

Timing and recording apparatus

Turning to FIGS. 3 to 5 of the drawings, the timing and recording apparatus 56 of the invention is illustrated therein as including a rectangular housing 140 having a bottom wall 142, a front wall 144, a rear wall 146 and side walls 148 and 150. Telescoped over the upper edges of the front, rear and side walls 144, 146, 148 and 150 is a cover 152 which is suitably secured in place and which may be sealed in any suitable manner to prevent tampering by unauthorized personnel.

The indicator light 100 is shown as centrally mounted on the front wall 144 adjacent the bottom thereof. The front wall 144 is provided on one side thereof with vertically spaced, upper and lower counter windows 154 and 156 through which the respective indicia of the glass and pitcher counters 126 and 132 of the timing and recording circuit means 92 are visible. The front wall 144 is provided on the other side thereof with vertically spaced, upper and lower counter windows 158 and 160 through which the respective indicia of the glass and pitcher counters of the timing and recording control circuit means 94 are visible.

The left side wall 148 is shown as provided with sockets 162, 164 and 166 for plugs at the ends of electrical cords, not shown, leading to the push button switches 58 and 60 and the solenoid valve 52 associated with the bartending station 32, and leading to the push button switches 62 and 64 and the solenoid valve 54 associated with the bartending station 34. The right side wall 150 may be provided with a socket, not shown, to receive a main power input plug, not shown.

Referring particularly to FIG. 4 of the drawings, suitably secured to the bottom and rear walls 142 and 146 of the housing 140 is a base 170 having a top wall 172 spaced upwardly from the bottom wall 142 of the housing, and having a front wall 174 spaced rearwardly from the front wall 144 of the housing, thereby providing a space 176 between the base front wall 174 and the housing front wall 144.

The transformers 96 and 98 are located in side-by-side relation between the bottom housing wall 142 and the top base wall 172, being secured to the top base wall 172 in upwardly spaced relation from the bottom housing wall 142. More particularly, the transformer 96, as shown in FIG. 4, is connected to the top base wall 172 in upwardly spaced relation from the bottom housing wall 142 by a front supporting wall 178 and a rear support 180. The other transformer 98 is supported in a similar manner, not shown. This construction isolates the transformer 96 from the housing 140 in a convenient manner, which is an important feature.

The two timing and recording circuit means 92 and 94 are embodied in timing and recording units disposed in side-by-side relation in the housing 140 above and forwardly of the base 170. Only the timing and recording unit embodying the timing and recording circuit means 92 is visible in FIG. 4 of the drawings, being indicated generally by the numeral 182. The timing and recording unit which embodies the timing and recording circuit means 94 is located directly behind the unit 182 and is mounted in the same manner, so that it need not be considered further herein.

The timing and recording unit 182 includes an elongated rectangular housing 184 which extends in the foreand-aft direction relative to the housing 140, and which is seated on the top wall 172 of the base 170. The housing 184 carries such electrical components of the timing and recording unit 182 as the relays 102, 104 and 114 and the timers 106 and 108, the timers being located adjacent the rearward end of the housing 184 and the relays adjacent the forward end thereof. At the forward end of the housing 184 is a vertical mounting plate 186. The glass and pitcher counters 126 and 132 are suitably mounted on the front side of the plate 186 in vertically spaced relation in locations to position their indicia opposite the respective glass and pitcher windows 154 and 156 in the front housing wall 144. It will be noted in this connection that the pitcher counter 132 and the pitcher window 156 are located below the top base wall 172 and within the space 176 between the front housing wall 144 and the front base wall 174, thereby providing a compact arrangement.

The electrical components incorporated in the timing and recording unit 182 are connected to the transformer 96, and the electrical elements associated therewith, by a plug and socket means 188 comprising a multi-prong, downwardly extending plug 190 on the unit 182 and a mating, upwardly facing socket 192 carried by the top wall 172 of the base 170. The location of the plug and socket means 188, electrically speaking, is shown in FIG. 2 of the drawings.

It will be apparent that, with the foregoing construction, the entire timing and recording unit 182 is installed in the housing 140 very simply by engaging the plug 190 with the socket 192, whereupon the unit 182 is seated on and supported by the base 170, being secured against horizontal movement by the plug and socket. Another important advantage of this construction is that a timing and recording apparatus for any number of bartending stations may be produced very simply by utilizing a housing 140 of appropriate size, installing therein a base 170 with the requisite number of transformers and sockets 192, and then simply plugging in the requisite number of timing and recording units. Further, since the timing and recording units are interchangeable, one requiring repair can be replaced with another very easily.

*Electrical plug securing means*

Referring to FIG. 6 of the drawings, illustrated therein is an electrical plug 200 shown as plugged into a socket 201 carried by a fragment of a housing 202, which may be similar to the housing 140, for example. An electrical-plug securing means 204 of the invention is secured to the housing 205 of the socket 201 and serves to secure the plug 200 against anything but intentional disengagement from its mating socket.

The securing means 204 comprises a spring clip having an arm 206 overlying the plug 200. Integral with the arm 206 is a generally perpendicular arm 208 which extends alongside the plug 200 toward the housing 202 and terminates in a tab 210 generally parallel to the arm 206 and seated against the socket housing 205. The tab 210 is pivotally secured to the socket housing 205 by a pivot pin 212. Preferably, the arm 206 makes an angle of slightly less than 90° with the arm 208 so that the free end of the arm 206 presses firmly against the plug 200 to secure it in place in a positive manner.

As will be apparent, when it is desired to disengage the plug 200 from its socket, it is merely necessary to pivot the clip 204 out of the way about the axis of the pivot pin 212. Conversely, the clip 204 may be pivoted into its plug-securing position about the axis of the pivot pin 212.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim as our invention:

1. In a timing and recording apparatus for use with an electrically operated system, the combination of:
   (a) a housing having bottom, front, rear and side walls;
   (b) said front wall of said housing having at least one counter window therein;
   (c) a base mounted in said housing and having a top wall and including at least one transformer;
   (d) at least one timing and recording unit enclosed by said housing and seated on said top wall of said base and including electrical components at least one of which is a counter visible through said counter window; and
   (e) plug and socket means on said base and said unit for electrically connecting said electrical components to said transformer.

2. A timing and recording apparatus according to claim 1 wherein said transformer is spaced upwardly from said bottom wall of said housing and is secured to said top wall of said base.

3. In a timing and recording apparatus for use with an electrically operated system, the combination of:
   (a) a housing having bottom, front, rear and side walls;
   (b) said front wall of said housing having at least one pair of counter windows therein;
   (c) a base mounted in said housing and having a top wall spaced upwardly from said bottom wall of said housing and including at least one transformer beneath said top wall of said base;
   (d) at least one timing and recording unit enclosed by said housing and seated on said top wall of said base and including electrical components two of which are counters respectively visible through said counter windows; and
   (e) plug and socket means on said base and said unit for electrically connecting said electrical components to said transformer.

4. A timing and recording apparatus according to claim 3 wherein said transformer is spaced upwardly from said bottom wall of said housing and is secured to said top wall of said base.

5. A timing and recording apparatus according to claim 3 wherein said base is spaced rearwardly from said front wall of said housing, wherein said counters and counter windows are vertically spaced, wherein the lowermost of said counters and counter windows are below said top wall of said base, and wherein said lowermost counter is located forwardly of said base and between said base and said front wall of said housing.

6. A timing and recording apparatus according to claim 5 wherein said transformer is spaced upwardly from said bottom wall of said housing and is secured to said top wall of said base.

7. A timing and recording apparatus according to claim 6 wherein said unit includes two timers located rearwardly of said counters and respectively electrically connected to said counters.

References Cited

UNITED STATES PATENTS 3,052,403    9/1962    Damon _____ 235—1

STEPHEN J. TOMSKY, *Primary Examiner.*